United States Patent [19]

Betz et al.

[11] 4,285,974

[45] * Aug. 25, 1981

[54] INTAKE LIMITING LIQUID FEED SUPPLEMENT FOR CATTLE

[75] Inventors: Norman L. Betz, St. Louis, Mo.; Kent J. Lanter, Belleville, Ill.; Danny L. Williams, Manchester, Mo.

[73] Assignee: Ralston Purina Company, St. Louis, Mo.

[*] Notice: The portion of the term of this patent subsequent to Oct. 28, 1997, has been disclaimed.

[21] Appl. No.: 101,665

[22] Filed: Dec. 10, 1979

Related U.S. Application Data

[63] Continuation of Ser. No. 930,787, Aug. 3, 1978, abandoned, which is a continuation-in-part of Ser. No. 849,741, Nov. 9, 1977, abandoned.

[51] Int. Cl.$^3$ .............................................. A23K 1/02
[52] U.S. Cl. ........................................ 426/2; 426/601; 426/608; 426/658; 426/807
[58] Field of Search .................. 426/658, 72, 74, 601, 426/602, 608, 807, 2, 630, 635, 636; 260/412.3, 412.5, 412.7, 424, 408

[56] References Cited

U.S. PATENT DOCUMENTS

| | | | |
|---|---|---|---|
| 2,970,910 | 2/1961 | Thurman | 426/807 |
| 3,428,660 | 2/1969 | Morren | 260/424 |
| 3,669,676 | 6/1972 | Karr et al. | 426/74 |
| 3,895,117 | 7/1975 | Backlund | 426/807 |
| 3,901,976 | 8/1975 | Roth et al. | 426/74 |

*Primary Examiner*—William F. Smith
*Attorney, Agent, or Firm*—Joseph M. Hageman

[57] ABSTRACT

A liquid feed composition for cattle is disclosed which is capable of controlling consumption by cattle to a desired level without the use of equipment for this purpose. The liquid feed composition includes an intake limiting amount of an acidulated fat wherein acidulation of the fat is carried out at a temperature of at least about 220° F. with a mineral acid.

20 Claims, No Drawings

INTAKE LIMITING LIQUID FEED SUPPLEMENT FOR CATTLE

This application is a continuation of our application U.S. Ser. No. 930,787, filed Aug. 3, 1978, abandoned, which was a continuation-in-part of our previously filed application, U.S. Ser. No. 849,741 filed Nov. 9, 1977, abandoned.

BACKGROUND OF THE INVENTION

This invention relates to an intake limiting liquid feed composition for cattle and a process for employing the same in order to attain an economical and efficient means of self-feeding cattle.

Liquid feed supplements are widely used for the feeding of cattle and have several advantages compared to dry feed supplements. One advantage is that since these feed supplements are in a liquid phase, the different components can be uniformly distributed throughout the liquid medium without difficulty. Furthermore, the liquid nature of these supplements make them economical to manufacture because of the relatively simple type of apparatus required for producing liquid feeds as compared to dry supplements.

These liquid feed supplements usually employ as a medium, a carbohydrate solution, such as molasses. A disadvantage, however, of liquid feed supplements is the high palatability of the molasses or liquid feed medium which causes the animals to consume excessive amounts thereby exceeding the point of most efficient feed utilization. This has necessitated the use of special equipment which is designed to "meter" the quantity of liquid feed supplement to the animal. Equipment of this type include "lick" wheels which are partially immersed in the feed supplement and as the animal licks the wheel it turns and carries supplement to the animal. This requirement for special equipment has, therefore, offset many of the economic advantages of manufacturing liquid feeds and a need exists for a liquid feed supplement which is self-limiting and which controls consumption by the animal to a predetermined level without special equipment for this purpose.

Copending U.S. patent application, Ser. No. 849,721, filed Nov. 9, 1977 abandoned, by the inventors herein, discloses a composition for controlling feed supplement intake which comprises an acidulated fat wherein acidulation of the fat is carried out at a temperature of at least about 220° F. with an acid, preferably a mineral acid. It has now been determined that the use of this specific type of acidulated fat in liquid feed supplements also controls consumption of these supplements by cattle without a requirement for special equipment.

SUMMARY OF THE INVENTION

The present invention provides an intake limiting feed composition for cattle which controls feed intake by the cattle and thereby provides a means of feeding the cattle without excessive consumption of the supplement and a need for special equipment in order to meter the supplement to the animal. The liquid feed composition of the present invention comprises a liquid feed supplement medium such as a soluble carbohydrate material and an unsaponified acidulated fat wherein acidulation of the fat is carried out at a temperature of at least about 220° F. with an acid, preferably a mineral acid. The acidulated fat may be employed in the liquid feed supplement at a level effective to limit intake and typically at a level which exceeds 1.5% by weight and preferably at a level between about 2 and 8% by weight.

The acidulated fat by itself is entirely satisfactory for intake limitation of the liquid feed supplement for cattle although, it may also be employed in combination with other intake limiters such as diammonium phosphate, ammonium sulfate, and combinations thereof. It is desirable in some instances to include these materials, since these additional limiters also contribute to the nutritive properties of the liquid feed supplement.

An object, therefore, of the present invention is to provide for a liquid feed composition which is capable of self-limiting intake by cattle without a requirement for special equipment to control consumption by the animal.

A further object of the present invention is to provide for a liquid feed composition which consists of components which individually do not detract from the nutrient requirements of the feed supplement, while at the same time control the liquid feed supplement intake to a predetermined amount in order to allow self-feeding by the cattle.

It is also an object of the present invention to provide a liquid feed supplement which may be combined with roughage sources or dry feed supplements to provide a convenient and economical means of feeding cattle.

DESCRIPTION OF THE PREFERRED EMBODIMENTS

In accordance with the present invention, a liquid feed composition has been developed which is capable of limiting intake to a predetermined amount that is necessary for proper weight maintenance of the cattle. This predetermined amount of feed supplement intake for cattle will accordingly vary depending on the type of animals as well as the enviornmental conditions under which they are maintained and is, therefore, not intended to limit the present invention although, it may be generally considered that a typical feed intake limitation for a liquid feed supplement will be less than about 6 lbs. of supplement per head per day preferably less than 4 lbs. per head per day and usually between about 2 to 4 lbs. of supplement per head of cattle per day. This amount of intake will generally be the amount which is necessary for proper weight maintenace as well as the most efficient feed utilization by the animal.

The liquid feed supplement of the present invention contains an intake limiting ingredient comprising an unsaponified acidulated fat wherein acidulation of the unsaponified fat selected from the group consisting of coconut oil, corn oil, cottonseed oil, plam oil, palm kernel oil, soybean oil, tallow and grease is carried out at a temperature of at least about 220° F. with an acid. The acidulated fat employed as an intake limiting ingredient of the present invention is fully described in co-pending U.S. patent application Ser. No. 849,721, abandoned, filed Nov. 9, 1977, and a continuation-in-part thereof (Ser. No. 930,786) filed Aug. 3, 1978, abandoned, both applications herein incorporated by reference. The acidulated fat may be employed in the liquid feed supplement medium in an amount effective to limit intake by cattle and typically is employed in the liquid feed supplement at a level exceeding 1.5% by weight and preferably at a level of between about 2 and 8% by weight. While it is preferred to employ the acidulated fat as the sole intake limiting ingredient for the liquid feed supplement of the present invention, nevertheless, it may also be used in combination with other intake limiting ingredients such as diammonium phosphate, ammonium sulfate, and combinations of these ingredients as desired.

The liquid feed supplement medium of the present invention generally comprises a liquid medium such as molasses or a liquid carbohydrate solution or a medium including materials such as sugars, pectins, dextrins, starches or other types of soluble carbohydrate materials. Molasses is employed as the preferred liquid feed supplement medium for the supplements of the present invention because of its low cost and availability. The molasses is commonly available as an aqueous solution and has a consistency varying from a thin to a thick syrup falling within the range of 50–90 Brix. The molasses can be any of the sugar containing molasses which are commercially available including cane or blackstrap molasses, and the like. These contain significant quantities of sugars which are an important source of organic nutrients and a carbohydrate source for the animal. Therefore, it is not intended to limit the present invention by the actual ingredients of a liquid feed supplement since besides the liquid medium as the primary ingredient, it is well known to add other materials to improve the nutritional or functional characteristics of the liquid feed supplement.

In addition to the liquid feed supplement medium, it is also desirable to include a colloid material such as clay, including bentonite or attapulgite clay at typical levels between 0.5 and 5% by weight or a vegetable gum such as xanthan gum at typical levels of 0.025 to 0.15% by weight since this assists in providing a uniformly thickened liquid feed supplement with the desired viscosity. In the event clay is used in the liquid feed supplements of the present invention, it is also desirable to include a dispersing agent such as a soluble phosphate salt, for example, sodium, potassium, ammonium, tripolyphosphate, pyrophosphate and polyphosphates. This improves dispersability of the clay in the liquid feed supplement medium. Typical amounts of a dispersing agent are between 0.1 to 20% by weight of the clay.

It is further desirable and well known in the art to include ingredients in the liquid feed supplement medium which are necessary to meet the nutritional requirements of the animal including even grains and other non-soluble feed materials as well as a non-protein nitrogen source, such as biuret or urea. The exact amount of these materials which may be employed is not critical to the practice of the present invention since this will be entirely within the judgement of a person skilled in the art in order to meet the nutrient requirements of the animal. Furthermore, various minerals, vitamins, or medicaments are dispersed in the liquid feed supplement medium to produce the desired nutritive properties for the animals.

The liquid feed supplement of the present invention may also contain in addition to the acidulated fat described herein, other intake limiters such as ammonium sulfate, or diammonium phosphate. These materials all individually contribute to the nutritive properties of the liquid feed supplement and typical amounts which may be employed include 0.1 to 5% of ammonium sulfate, and 0.1 to 5% of diammonium phosphate. The liquid feed supplement of the present invention may be fed to cattle directly and thereby self-limit intake to the cattle without a requirement for special equipment in order to meter a designated amount of supplement to the animal. It is also within the scope of the present invention that the liquid feed supplement described herein may be mixed with other dry feed supplements or various roughage sources which can then be fed to the cattle.

For the purposes of full and complete disclosure, the following Examples are set forth as illustrative rather than limiting embodiments thereof.

EXAMPLE 1

Four separate batches of a liquid feed supplement were prepared and identified as Supplements A, B, C, and D. Supplements B, C, and D contained varying levels of an acidulated fat prepared by taking 2,000 lbs. of bleachable fancy tallow and adding 10% by weight of concentrated hydrochloric acid (36% HCL). This mixture was heated for 120 minutes until a temperature of 260° F. was achieved at which point the mixture was held at this temperature for a period of 3 hours. The acidulated fat was then neutralized to a pH of 5.0 with sodium hydroxide. The acidulated fat was added to Supplements B, C, and D according to the following formula. Supplement A was a control which contained only 5% by weight of a non-acidulated animal fat.

| Ingredient | Supplement | | | |
|---|---|---|---|---|
| (% by weight) | A (control) | B | C | D |
| Ammonium Polyphosphate | 6.4 | 6.4 | 6.4 | 6.4 |
| Calcium Carbonate | 4.0 | 4.0 | 4.0 | 4.0 |
| Attapulgite Clay | 1.5 | 1.5 | 1.5 | 1.5 |
| Urea | 3.0 | 3.0 | 3.0 | 3.0 |
| Molasses | 69.59 | 66.59 | 68.59 | 70.59 |
| Water | 10.0 | 10.0 | 10.0 | 10.0 |
| Vitamins & Minerals | 0.21 | 0.21 | 0.21 | 0.21 |
| 50% Sodium Hydroxide | 0.30 | 0.30 | 0.30 | 0.30 |
| Acidulated Fat | — | 8.0 | 6.0 | 4.0 |
| Animal Fat (not acidulated) | 5.0 | — | — | — |

The above identified liquid supplements were prepared by combining the molasses, water, and sodium hydroxide solution, mixing for 15 seconds, followed by the addition of the ammonium polyphosphate and mixing for an additional 10 seconds. The attapulgite clay was then added and mixed for 2 minutes, followed by the dry urea which was mixed for 1 minute. The acidulated or non-acidulated fat in the use of the control was then added and mixed for 5 seconds followed by the addition of the vitamins and minerals with mixing for an additional 2½ minutes.

Supplements "B", "C", and "D" were each fed in a separate 2 week feeding trial to a total of 6 cows against Supplement "A" which served as a control. The supplements were available to the cattle in an open container on a free choice basis. Average consumption was determined to be the following:

| Supplement | Consumption (lb. per head per day) |
|---|---|
| Feeding Trial No. 1 | |
| A (control) | 8.7 |
| B | 1.68 |
| Feeding Trial No. 2 | |
| A (control) | 11.5 |
| C | 1.66 |
| Feeding Trial No. 3 | |
| A (control) | 14.9 |
| D | 2.6 |

We claim:

1. An intake limiting liquid feed supplement for cattle containing an intake limiting composition, said feed supplement comprising a liquid carbohydrate medium, said intake limiting composition being present in an amount effective to limit intake of said supplement, consisting essentially of an acidulated unsaponified fat selected from the group consisting of coconut oil, corn oil, cottonseed oil, palm oil, palm kernel oil, soybean oil, tallow, and grease which has been acidulated at a temperature of at least about 220° F. with an acid.

2. The liquid feed supplement of claim 1 wherein acidulation has been carried out at a temperature of about 260° F.

3. The liquid feed supplement of claim 1 wherein the acid is a mineral acid.

4. The liquid feed supplement of claim 3 wherein the mineral acid is hydrochloric acid.

5. The liquid feed supplement of claim 1 wherein the amount of said acidulated fat effective to limit intake is at least about 1.5% by weight of said supplement.

6. The liquid feed supplement of claim 1 wherein the amount of said acidulated fat effective to limit intake is between about 2 to 8% by weight of said supplement.

7. The liquid fed supplement of claim 1 wherein the liquid carbohydrate medium is molasses.

8. The liquid feed supplement of claim 1 wherein an inake limiting amount of a material selected from the group consisting of diammonium phosphate, ammonium sulfate, and combinations thereof is included.

9. The liquid feed supplement of claim 8 wherein the level of ammonium sulfate is 0.1 to 5% by weight of said supplement, and the level of diammonium phosphate is 0.1 to 5% by weight of said supplement.

10. An intake limiting liquid feed supplement for cattle containing an intake limiting composition, said feed supplement comprising molasses, a dispersing agent, and a colloid material, said intake limiting composition being present in an amount effective to limit intake of said supplement and consisting essentially of an acidulated unsaponified fat selected from the group consisting of coconut oil, palm oil, palm kernel oil, soybean oil, tallow, and grease which has been acidulated at a temperature of at least about 220° F. with an acid.

11. A liquid feed supplement for cattle as set forth in claim 10 wherein acidulation of the fat has been carried out at a temperature of at least about 260° F.

12. A liquid feed supplement as set forth in claim 10 wherein the dispersing agent is employed at a level between about 0.1 to 20% by weight of said colloid material.

13. The liquid feed supplement of claim 10 wherein the colloid material is employed at a level of between about 0.5 to 5% by weight of said supplement.

14. The liquid feed supplement of claim 10 which includes 0.1 to 5% by weight of said supplement of ammonium sulfate, and 0.1 to 5% by weight of said supplement of diammonium phosphate.

15. A method of self feeding cattle with a liquid feed supplement comprising administering a liquid feed supplement medium comprising a liquid carbohydrate medium with an intake limiting composition, said composition being present in an amount effective to limit intake of the supplement and consisting essentially of an acidulated unsaponified fat selected from the group consisting of coconut oil, palm oil, palm kernel oil, soybean oil, tallow, and grease which has been acidulated at a temperature of at least about 220° F. with an acid.

16. The method of claim 15 wherein the intake limiting amount is at least about 1.5% by weight of said supplement.

17. The method of claim 15 wherein acidulation has been carried out at a temperature of about 260° F.

18. The method of claim 15 wherein the acid is a mineral acid.

19. The method of claim 18 wherein the mineral acid is hydrochloric acid.

20. The method of claim 15 wherein the liquid carbohydrate medium is molasses.

* * * * *